3,334,064
TERTIARY PHOSPHINES AS FLAME-RETARDANT
AGENTS FOR ACRYLIC POLYMERS
William John Bailey, University Park, Md., assignor to
American Cyanamid Company, Stamford, Conn., a corporation of Maine
No Drawing. Filed Feb. 18, 1964, Ser. No. 345,581
1 Claim. (Cl. 260—45.7)

This invention relates to flame-retardant compositions. More particularly, this invention relates to flame-retardant compositions comprising acrylic or methacrylic polymers containing a flame-retarding amount of a tertiary phosphine. More particularly, this invention relates to flame-retardant compositions comprising acrylic or methacrylic polymers containing a flame-retarding amount of a compound having the formula (I) 

wherein R is an aryl radical of from 6 to 10 carbon atoms, inclusive, and $R^1$ and $R^2$ are, individually, an aryl radical of from 6 to 10 carbon atoms, inclusive, or a methyl radical.

The use of various materials incorporated into acrylic polymers in order to improve the flame-retardance thereof has been known in the prior art. Many compounds are commercially available for such a use, among them being chlorostyrene copolymers, chlorinated paraffin wax with triphenyl stibine, chlorinated paraffins and aliphatic antimony compounds, antimony oxide-chlorinated hydrocarbon mixtures as well as phosphoric acid. A drawback, however, of these compounds has been the fact that generally a large amount, i.e. upwards of 35%, of additive must be incorporated into the resin in order to make it sufficiently flame-retardant. These prior art additives also tend to crystallize or oil out of the resin after a relatively short time of incorporation. A further problem, in regard to phosphoric acid, is that it tends to cause the resin to become opaque as the relative humidity increases.

In view of these problems, I have now found a group of compounds which may be added to acrylic resins, in relatively small amounts, to produce satisfactory flame-retardant compositions, which compounds will not crystallize or oil out of the resin after incorporation therein and which result in a composition which remains opaque under humid conditions.

The production of acrylic resin compositions which are flame retardant, i.e. have high resistance to heat, is of considerable commercial importance. For example, such articles as castings, moldings, laminated structures and the like are required, or at least desired, to be resistant to fire and flame and to possess the ability to endure heat without deterioration. Typical illustrations of such applications can be found in casting for live electrical contacts which should not be ignited or deteriorated by heat and sparks. Structural members such as pipes, wall coverings, wall paneling, windows and items such as waste baskets, fibers and the like are further examples of products wherein flame retardance is desirable.

It is therefore an object of the present invention to provide novel flame-retardant resin compositions.

It is a further object of the present invention to provide flame retardant compositions comprising acrylic or methacrylic polymers and a flame-retarding amount of a compound represented by Formula I.

These and further objects will become more apparent to those skilled in the art upon reading the more detailed description set forth hereinbelow.

THE ACRYLIC AND METHACRYLIC RESINS

The acrylic and methacrylic polymers into which the flame retardant agents may be incorporated to produce the novel compositions of the present invention, are generally the homopolymers and copolymers etc. containing, as the major constituent, an acrylate or methacrylate having the formula (II) 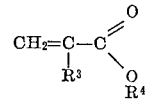

wheren $R^3$ is a hydrogen or methyl radical and $R^4$ is a hydrogen or an alkyl radical having from 1 to 6 carbon atoms, inclusive. Examples of monomers represented by Formula II include acrylic acid, methacrylic acid and their esters such as methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding methacrylates.

Examples of monomers which may be used to form the copolymers encompassed by the present invention, polymerized either singularly or in combination (two, three or more) with the compounds represented by Formula II, set forth hereinabove, in concentrations of from about 0% to about 95% are such monomers as the unsaturated alcohol esters, more particularly, the alyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes, such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrene, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Other examples of monomers that can be used as co-mononomers to form the copolymeric resin portion of our novel flame-retardant compositions are the vinyl halides, more particularly, vinyl fluoride, vinyl chloride, vinyl bromide, and vinyl iodide, and the various vinylidene compounds, including the vinylidene ahlides, e.g. vinylidene halides, e.g. vinylidene chloride, vinylidene bromide, vinylidene fluoride, and vinylidene ioddide, other comonomers being added, if needed, in order to improve the compatibility and copolymerization characteristics of the resultant polymers.

The above-mentioned monomers, i.e. those of Formula II, and the specified monomeric compounds copolymerizable therewith may be polymerized, copolymerized, etc., in any known manner such as by free-radical generating catalysts, irradiation, anion and cation type catalysts and the like, said method of polymerization forming no part of the present invention.

THE TERTIARY PHOSPHINES

As mentioned above, I have discovered the addition of various tertiary phosphines to acrylic or methacrylic resins result in the production of resinous compositions having excellent flame-retardant properties. According to the present invention, any tertiary phosphine represented by Formula I, above, stable to processing conditions, may be used for this purpose. The tertiary phosphines may be incorporated into the acrylic resins in flame-retarding amounts, i.e. generally amounts ranging from about 10% to about 35%, by weight, preferably 15% to 25%, by weight, based on the weight of the polymer, have been found sufficient.

The tertiary phosphines can be incorporated into the acrylic resin by any known method. That is to say, the flame-retardant additive may be combined with the resin by milling the resin and the additive on, for example, a two-roll mill, in a Banbury mixer, etc., or the phosphine may be added by molding it and resin simultaneously, extruding it and resin or by merely blending the resin in powder form with the phosphine and thereafter forming the final desired article. Additionally, the phosphine may be added during the resin manufacture, i.e., during the monomer polymerization procedure, provided the catalyst etc. and other ingredients of the polymerization system are inert thereto.

The tertiary phosphines set forth hereinabove may be produced in any known manner without varying from the scope of the present invention. Various methods for the production of phosphines of this type are disclosed in, for example, U.S. Patent No. 2,912,965 and this patent is hereby incorporated herein by reference.

Generally, one procedure for the production of the tertiary phosphines comprises reacting a halogenated phosphine with a trisubstituted magnesium halide, i.e.

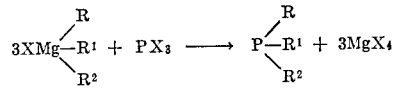

wherein R, $R^1$ and $R^2$ are as defined above in regard to Formula I, and X is a halogen atom, e.g., chlorine.

Examples of compounds which are represented by Formula I and are therefore useful in producing the novel compositions of the present invention, include: triphenyl phosphine, tritolyl phosphine, trixylyl phosphine, triduryl phosphine, trinaphthyl phosphine, methyl diphenyl phosphine, methyl ditolyl phosphine, methyl dixylyl phosphine, didurylmethyl phosphine, methyl dinaphthyl phosphine, dimethylphenyl phosphine, dimethyltolyl phosphine, dimethylxylyl phosphine, duryldimethyl phosphine, dimethylnaphthyl phosphine and the like.

It is also within the scope of the present invention to incorporate such ingredients as plasticizers, dyes, fillers, pigments, stabilizers, lubricants, antioxidants, antistatic agents and the like to our novel compositions.

The following examples are set forth for purposes of illustration only and are not to be construed as limitations on the present invention except as set forth in the appended claim. All parts and percentages are by weight unless otherwise specified.

Any appropriate flame retardance test may be used to determine the flame retardance properties of any specific compound. One test which is reasonably efficient is that designated as a modified version of ASTM test D–635–56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

Example 1

Eighty-five parts of poly(methyl methacrylate) and 15 parts of triphenyl phosphine are milled together on a two roll mill at about 170° C. The resulting milled composition is molded into strips 5" in length, 0.5" in width and 0.045" in thickness and said strips are then subjected to an art recognized flame-retardance test. The strips pass the test and are therefore designated as flame-retardant.

Following the procedure of Example 1, the following examples were carried out utilizing different flame retardant agents and various acrylic polymers. The results of these examples are set forth in Table I below. In each instance the resultant acrylic-tertiary phosphine mixture passed the flame-retardance test and was designated as flame and fire retardant. In the table, PMMA=poly(methyl methacrylate), AN=acrylonitrile, ST=styrene, EA=ethyl acrylate, BA=n-butyl acrylate, MS=p-methyl styrene, AM=acrylamide, PMA=poly(methacrylic acid), BD=butadiene and PEA=poly(ethyl acrylate).

TABLE I

| Ex. | Polymer | R | $R^1$ | $R^2$ | Percent |
|---|---|---|---|---|---|
| 2 | PMMA | Tolyl | Tolyl | Tolyl | 15 |
| 3 | PMMA | Xylyl | Xylyl | Xylyl | 25 |
| 4 | PMMA | Dyryl | Dyryl | Dyryl | 20 |
| 5 | PMMA | Naphthyl | Naphthyl | Naphthyl | 20 |
| 6 | MMA/ST/AN 71/19/10 | Phenyl | Phenyl | Phenyl | 15 |
| 7 | MMA/ST/AN 71/19/10 | Tolyl | Tolyl | Tolyl | 20 |
| 8 | MMA/ST/AN 71/19/10 | Xylyl | Xylyl | Xylyl | 20 |
| 9 | MMA/ST/AN 71/19/10 | Dyryl | Dyryl | Dyryl | 25 |
| 10 | MMA/ST/AN 71/19/10 | Naphthyl | Naphthyl | Naphthyl | 15 |
| 11 | EA/AN 75/25 | Tolyl | Tolyl | Tolyl | 20 |
| 12 | BA/MS/AM 80/15/5 | Naphthyl | Naphthyl | Naphthyl | 15 |
| 13 | PMMA | Phenyl | Phenyl | Methyl | 20 |
| 14 | PMMA | Tolyl | Tolyl | do | 20 |
| 15 | PMMA | Naphthyl | Naphthyl | do | 20 |
| 16 | MMA/ST/AN 71/19/10 | Phenyl | Methyl | do | 15 |
| 17 | PMMA | Tolyl | do | do | 20 |
| 18 | PMA | Naphthyl | do | do | 20 |
| 19 | Mixture of BD-AN (10-75%) and AN-ST (25-90%).* | Phenyl | do | do | 30 |
| 20 | EA/AN 75/25 | Xylyl | do | do | 30 |
| 21 | PMMA | do | Xylyl | do | 20 |
| 22 | PEA | Phenyl | Phenyl | Phenyl | 15 |

*U.S. Patent No. 2,439,202.

I claim:

A flame-retardant composition comprising poly(methyl methacrylate) and from about 10% to about 35%, based on the weight of the poly(methyl methacrylate), of triphenyl phosphine.

References Cited

UNITED STATES PATENTS

| | | | |
|---|---|---|---|
| 2,833,741 | 5/1958 | Lal | 260—45.75 |
| 3,058,941 | 10/1962 | Birum | 260—45.7 |
| 3,162,613 | 12/1964 | Tousignant | 260—45.7 |
| 3,257,460 | 6/1966 | Gordon et al. | 260—45.7 |

OTHER REFERENCES

ASTM Standards on Plastics, ASTM, Philadelphia, 1959.

DONALD E. CZAJA, *Primary Examiner.*

LEON J. BERCOVITZ, *Examiner.*

M. J. WELSH, *Assistant Examiner.*